Figure 1:
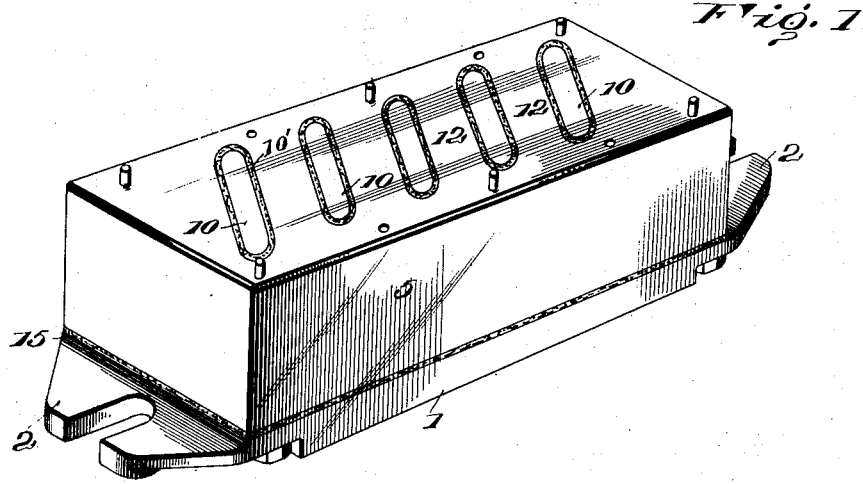

R. C. PATTON.
WATER TIGHT JOINT FOR MAGNETIC CIRCUITS.
APPLICATION FILED JULY 11, 1912.

1,082,134.

Patented Dec. 23, 1913.

Witnesses
Jas. H. Anderson
E. E. Warfield

Inventor
Ralph C. Patton
By Marro, Cameron, Lewis & Massie
Attorneys

UNITED STATES PATENT OFFICE.

RALPH C. PATTON, OF PROVIDENCE, RHODE ISLAND, ASSIGNOR TO D & W FUSE COMPANY, OF PROVIDENCE, RHODE ISLAND, A CORPORATION OF RHODE ISLAND.

WATER-TIGHT JOINT FOR MAGNETIC CIRCUITS.

1,082,134.   Specification of Letters Patent.   Patented Dec. 23, 1913.

Original application filed April 25, 1912, Serial No. 693,252. Divided and this application filed July 11, 1912. Serial No. 708,878.

*To all whom it may concern:*

Be it known that I, RALPH C. PATTON, of Providence, Rhode Island, have invented a new and useful Improvement in Water-Tight Joints for Magnetic Circuits, which invention is fully set forth in the following specification.

This invention is shown and described in my copending application, filed April 25, 1912, Serial No. 693,252, of which this application is a division, and relates to improvements in water-tight joints for use more particularly in magnetic chucks though capable of use wherever a water-tight joint is indicated in a magnetic circuit.

In using magnetic chucks, it is frequently necessary to flood the chuck with water particularly during the process of grinding. Difficulty has arisen in making a water-tight joint between the casing walls and the bottom plate of the chuck without interposing resistance to the flow of magnetic lines at that point such as results by the use of a gasket which necessitates a magnetic gap at the joint. I have devised a calking joint which does not interfere to any appreciable extent with the flow of magnetic lines across the joint while securing the necessary degree of tightness to exclude water. While the details of construction of my calking joint may be varied the essential feature of construction resides in providing a reëntering groove in the edge of the wall where the joint occurs adapted to receive and retain calking material such as hemp, twine or the like which is rendered impervious to water by water-proofing material such as paint, pitch, shellac, varnish or similar materials or the calking space may be filled with any of the latter materials introduced in a suitable plastic condition, either pure or containing an admixture of the fibrous material to act as a binder. Either member of the joint may be provided with the retaining groove or both members may be so provided. The shape of the groove may take on various forms either curvilinear or angular provided that a reëntering space is formed capable of acting to retain packing. This joint avoids the use of gaskets while securing a water-tight joint and has the advantage of interfering with the flow of magnetic lines across the junction of the parts to a minimum degree.

In order that the invention may be clearly understood and readily carried into effect, I will describe the same with one constructional form embodying the invention represented by way of example in the accompanying drawings in which:—

Figure 2:
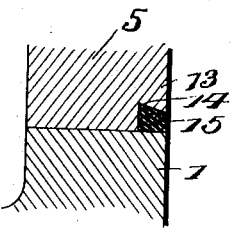

Figure 1 is a perspective view of a magnetic chuck embodying my improvement, and Fig. 2 is an enlarged detail showing my improved packing joint.

In Fig. 1 is represented a magnetic chuck, fully described in my application Serial No. 693,252. Only so much of the same is here described as is necessary to a proper understanding of my present improvement. The chuck comprises a casing 5 having a top surface divided into a plurality of polar areas 10 of one polarity separated from the polar remaining surface 12 by non-magnetic gaps 10'.

The casing rests on a base plate 1 provided with slotted projections for clamping the chuck to a bed plate of a planing or like machine.

15 indicates the exposed packing in the calking joint between the casing 5 and base 1. This joint is shown in an enlarged view, Fig. 2, in cross section in which 13 is the wall of the casing provided on its outer edge with a dovetail groove 14 which follows around the bottom of the casing. The third side of the packing joint is formed by the surface of the base plate 1. Into this holding space is packed calking material 15 such as twine or the like saturated with water-proofing material such as shellac or some air drying varnish. It will be noted that this calking joint occupies but a small portion of the junction between the two magnetic surfaces across which the magnetic flux flows and therefore interferes but little with the magnetic circuit at this point while securing all the requisites of a water-tight joint without the use of a gasket which seriously interferes with the flux across the junction and with the holding power of the chuck. The packing can be readily removed for the purpose of gaining access to the interior of the casing and can be easily replaced without the use of any special tools.

What is claimed is:—

1. In a calking joint for a magnetic circuit, the combination of two abutting members of magnetic material, the edge of one member having a reëntering groove and calking material adapted to be introduced into said groove in plastic condition and therein harden and be retained by said groove against the opposite member.

2. In a calking joint for a magnetic circuit, the combination of two abutting members of magnetic material, the edge of one member being provided with an angular dovetail groove and calking material adapted to be introduced into said groove in plastic condition and therein harden and be retained by said groove against the opposite member.

3. In a calking joint for a magnetic circuit, the combination of two abutting members of magnetic material, the outer corresponding edges of the two members being cut away so as to form a reëntering groove holding calking material adapted to be introduced into said groove in plastic condition and therein harden and be retained by said groove.

In testimony whereof I have signed this specification in the presence of two subscribing witnesses.

RALPH C. PATTON.

Witnesses:
G. W. STEERE,
K. E. GREENE.